3,147,379
METHOD FOR MEASURING THE POWER LEVEL OF A NUCLEAR REACTOR
Sigmund P. Harris, Van Nuys, Calif., assignor, by mesne assignments, to the United States of America as represented by the United States Atomic Energy Commission
Filed Oct. 21, 1960, Ser. No. 64,104
1 Claim. (Cl. 250—83.1)

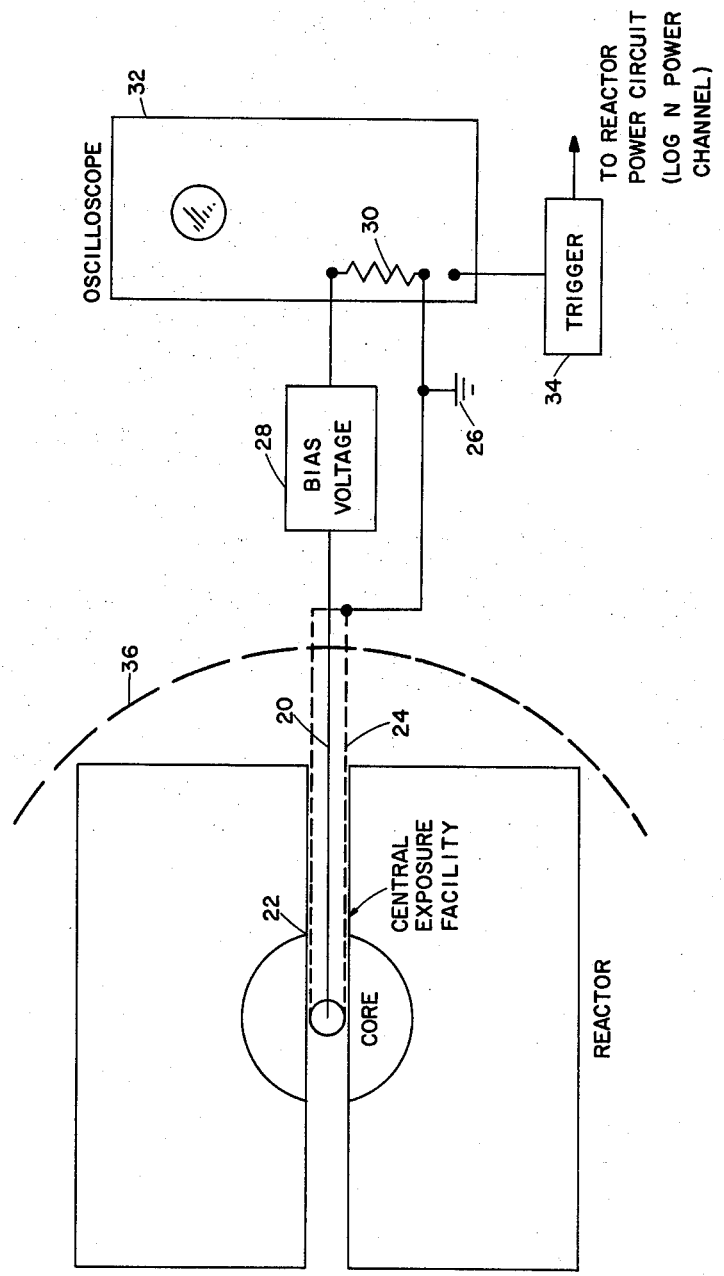

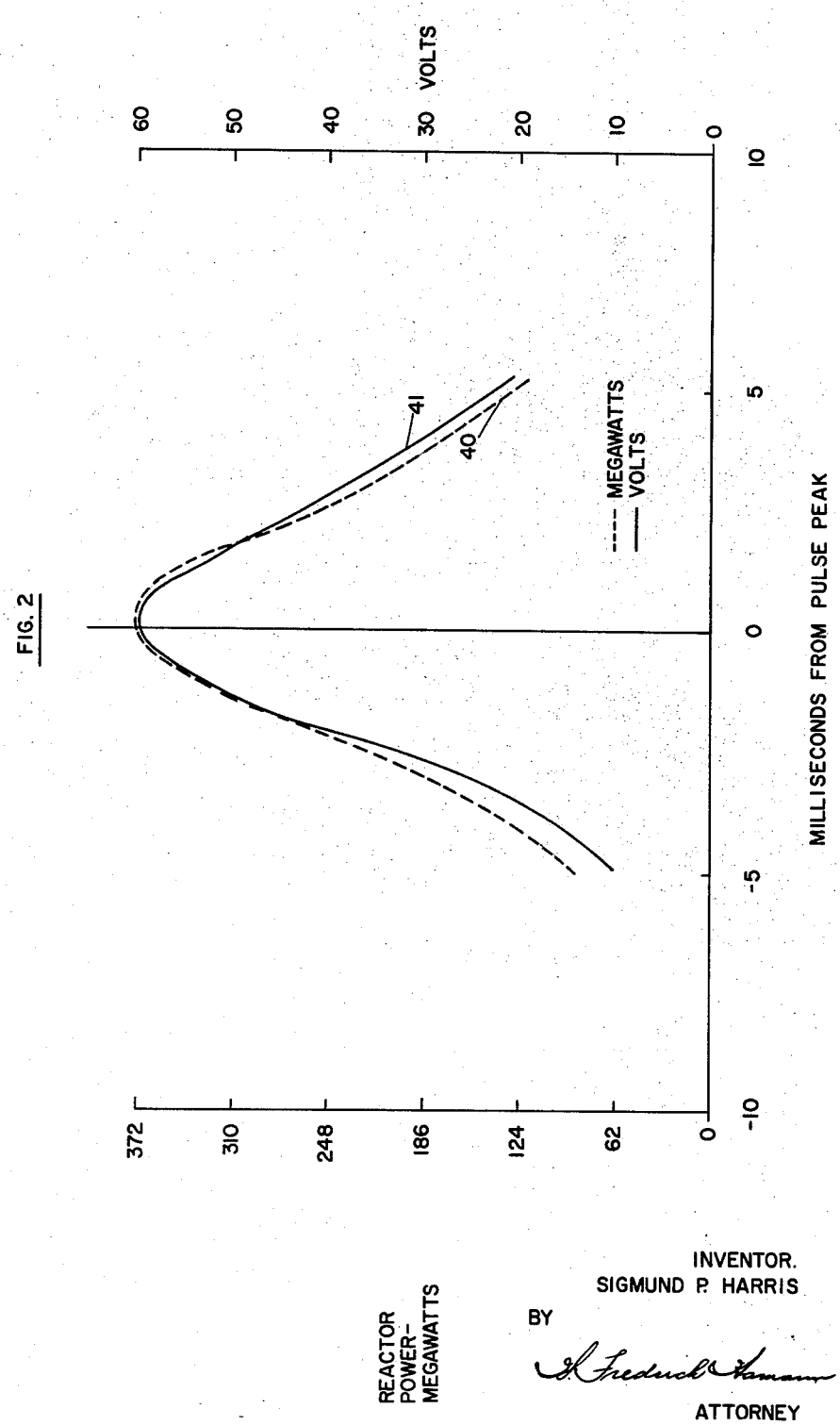

The present invention relates to a method and apparatus for measuring the power level of a nuclear reactor.

In the conventional reactor control system a plurality of independent monitoring circuits are generally utilized for measuring and visually presenting to the operator the reactor power during operation. Each monitoring circuit includes at least one neutron detector, generally of the ionization chamber type, through which the translation from neutron field strength to power level is made. These circuits include an ionization chamber, polarizing batteries, an electrometer pre-amplifier, a galvanometer drive amplifier, a galvanometer, and interconnecting cables. The ionization chambers are usually located at positions of relatively low neutron flux and power calibrations are made to ensure the accuracy of the power level indication given.

It is the primary purpose of the present invention to provide a method and apparatus for measuring the power level of a reactor by subjecting the measuring element to the high flux in the core and obtaining directly from the irradiated element an indication of the power level.

It is therefore an object of the present invention to provide a method and apparatus for measuring the power level of a nuclear reactor.

It is another object of the present invention to provide a method and apparatus for measuring the power level of a reactor where the flux reaches levels of at least about $10^{13}$ $n/cm.^2$-sec.

It is another object of the present invention to provide a method and apparatus for measuring the power level of a reactor during an excursion.

It is a still further object of the present invention to provide a method for generating an electrical signal which is proportional to the power level of a nuclear reactor.

It is a further object of the present invention to provide a method for converting the gamma-ray and/or neutron energy from a nuclear reactor into electrical energy, which electrical energy may be utilized as an indication of the power level of the nuclear reactor.

These and other objects and advantages of the present invention will be more apparent from the following detailed description and drawings, hereby made a part hereof, in which:

FIGURE 1 is a schematic drawing of one arrangement of the apparatus utilizing the method of the present invention;

FIGURE 2 is a graph of the output of voltage signal compared to reactor power level.

One apparatus for practicing the method of the present invention is shown schematically in FIGURE 1. Specifically, a central electrical conductor 20 is placed within the central exposure facility 22 of a nuclear reactor, for example a water boiler type, or adjacent the reactor core; in either event, the conductor must be within the radiation field of the reactor core. An electrically conductive sheath 24 is preferably located around the conductor 20 and is connected to a common ground 26. The conductor 20 may be connected to a bias voltage supply 28 or directly to one side of an input resistor 30 of an oscilloscope 32, the other side of the resistor 30 being connected to common ground 26. The scope 32 is connected to a standard trigger circuit 34 which is controlled by the reactor power level circuit, e.g., a log-N power channel. In this manner the scope is triggered to record on film the voltage signal or pulse between conductor 20 and ground sheath 24 when the reactor power level is to be measured.

More specifically, the method used to detect the radiation-induced voltages is to observe directly the voltage output of the cables being tested using an oscilloscope.

Radiation-induced signals occurring during the power pulse of the reactor providing the radiation field were detected in the following types of cables: Microdot (type 50–3804); MgO insulated, RG–62/U, RG–19/U, and Twinax (Belden 8227). In the case of the RG–19/U the end in the reactor was covered with polyethylene to eliminate the air gap. Ordinary #22 gauge stranded hook-up wire was also found to produce a signal. These signals varied from a few tenths to many volts across a one megohm resistor during transients involving maximum fluxes of $5 \times 10^{15}$ $n/cm.^2/sec.$ Accompanying gamma ray fluxes were approximately $3 \times 10^{16}$ $\gamma/cm.^2/sec.$ with an average gamma ray energy of 1 mev., or about $5 \times 10^{10}$ r./hr. The results are tabulated in Table I with the cable characteristics and geometry tabulated in Table II.

*Table I*

| Cable description | Reactor peak power (Mw.) | Bias | Radiation signal (max.) |
|---|---|---|---|
| RG 19/U | 360 | None | +60 v. |
| RG 19/U | 362 | −90 v. | +53 v. |
| RG 19/U | 363 | None | +8.0 v.[1] |
| Twinax: | | | |
|   Cu wire | 362 | do | −1.3, +0.3 v. |
|   Tinned wire | 362 | do | −1.3, +0.1 v. |
| Hook-up wire | 365 | do | +3.6 v. |
|   Do | 432 | do | +22.5 mv.[2] |
| Bare Cu wires | 525 | do | +1.3 v.[3] |
|   Do | 560 | +9.1 v. | +10.2 v. |
|   Do | 532 | −9.1 v. | −7.2 v. |
| Microdot 50–3804 | 525 | None | +1.3 v. |
|   Do | 560 | +9.1 v. | +4.6 v. |
|   Do | 532 | −9.1 v. | −2.9 v. |
|   Do | 513 | None | +1.5 v. |
| McGraw-Edison | 525 | do | +0.6 v. |
|   Do | 532 | do | +0.65 v. |
|   Do | 513 | +9.1 v. | +7.7 v. |
| RG 62/U | 596 | None | +4.0 v. |

[1] Across $91 \times 10^3$ ohm resistance.
[2] With 800 ohm wire-wound resistance on end.
[3] Presence of grounded aluminum liner in central exposure facility gave this effect.

*Table II*

| Type | Inner conductor | Dielectric Material | Nom. dia. of dielectric (in.) | No. and type shielding braid | Protective covering | Nominal overall diameter (in.) |
|---|---|---|---|---|---|---|
| RG-19/U | 0.250″ Cu | Solid polyethylene | 0.910 | Cu single | Grey polyvinylchloride non-contaminating type plasticizers. | 1.120 |
| RG-62/U | 22 AWG Cu-weld | Air-spaced ployethylene. | 0.146 | ____do____ | Low temp. black polyvinylchloride, contaminating type plasticizers. | 0.242 |
| Microdot (50-3804) | 29 AWG Cu-weld | Polyethylene | 0.040 | 48 strands of 38 gauge | Polyvinylchloride | 0.088 |
| Twinax | 7-20 AWG ea. tinned Cu—7-20 AWG ea. Cu. | ____do____ | 0.238 | Tinned lu | Polyethylene plastic jacket—Black vinyl plastic jacket. | 0.325 |
| Hook-up wire | 22 AWG Cu | Vinyl | 0.061 | None | None | 0.061 |
| Bare Cu | 0.125 Cu | Air | N.A. | ____do____ | ____do____ | 0.125 |
| McGraw-Edison | Cu | MgO | 0.060 | Stainless steel sheath | ____do____ | 0.070 |

In most cases, the end of the cable, placed at the center of the exposure facility or near the reactor, is left open. The exception is the hook-up wire cable which terminates in an 800 ohm wire-wound resistor in the reactor and is connected to a Kintel amplifier, which is then connected to the oscilloscope. For the bare copper wire pair, two ⅛ in. copper rods are supported on porcelain insulators outside the reactor and the two rods are long enough to reach into the center of the reactor without additional support.

The oscilloscope is triggered externally by the output of a thyratron which is fired by a signal from the log-N power channel early during the rising portion of a power transient. A sweep speed of 5 milliseconds per centimeter is used in all cases. A portion of the thyratron signal is supplied to a galvanometer in the oscillograph used routinely to record reactor power in order to record the time of triggering.

The signal induced in the conductor 20 relative to the ground 26 is the result of an interaction between the radiation field 36 and the conductor and/or insulator. A radiation field strength of at least $10^{13}$ $n/cm.^2/sec.$ and corresponding gamma ray fluxes are required to obtain useful voltage signals. The exact mechanism taking place, i.e., the theory upon which the observed effects are based, is as yet uncertain. It may be explained on the basis of carriers (electrons) produced in the insulator by gamma rays and recoil protons, or by the photoelectric ejection of electrons from metals by ionizing radiation. No theory, however, as yet explains satisfactorily the observed electrical behavior.

The signal obtained is calibrated in terms of reactor peak power, and after such calibration the peak power may be measured directly in terms of the voltage signal amplitude. FIGURE 2 shows one example of the radiation-induced signal in an RG-19/U type cable compared with reactor power. The curve 40 shows the reactor power as measured by conventional circuits as a function of time in milliseconds before and after the peak power of the reactor. Curve 41 shows the voltage induced in the RG-19/U cable as compared to the megawatt curve 40. The extremely close correspondence indicates that induced voltage in the cable is directly proportional to the reactor power and is the result of the creation of a signal in the cable by the radiation field of the reactor. The induced voltage in the RG-19/U case was obtained from a cable 5 ft. in length inserted in the center of the exposure facility. Curves such as those of FIG. 2 have also been obtained for the other cables. A comparison of Tables I and II indicates that the magnitude of the radiation-induced signal is a function of the surface area or volume of the conductor utilized, and that the insulation as well as its thickness affect the signal magnitude.

It is to be understood that the foregoing description is by way of illustration only and not by way of limitation, the accompanying claim setting for the limits of the invention.

What is claimed is:

A method for measuring the power level of a nuclear reactor which is pulsed to provide a neutron flux of at least about $10^{13}$ $n/cm.^2/sec.$, comprising the steps of placing a coaxial cable having a central electrical conductor, a solid insulator surrounding said conductor, and a ground sheath around said insulator in the core of a nuclear reactor, connecting said ground sheath to ground, pulsing said reactor, and measuring the radiation-induced voltage between said conductor and ground, said induced voltage being proportional to the power level of said reactor.

References Cited in the file of this patent

UNITED STATES PATENTS

| | | |
|---|---|---|
| 804,189 | Fleming | Nov. 7, 1905 |
| 2,696,564 | Ohmart | Dec. 7, 1954 |
| 2,867,727 | Welker et al. | Jan. 6, 1959 |
| 2,965,780 | Bayard et al. | Dec. 20, 1960 |
| 3,028,517 | Ryan | Apr. 3, 1962 |

FOREIGN PATENTS

| | | |
|---|---|---|
| 955,172 | Germany | Dec. 27, 1957 |